United States Patent [19]

Chang

[11] Patent Number: 5,687,456
[45] Date of Patent: Nov. 18, 1997

[54] TYING DEVICE

[76] Inventor: Kun-Sheng Chang, No. 25, Alley 59, Chung Cheng Rd., Luchou Hsiang, Taipei Hsien, Taiwan

[21] Appl. No.: 694,608

[22] Filed: Aug. 9, 1996

[51] Int. Cl.[6] .................................................. B65D 63/10
[52] U.S. Cl. ............................... 24/16 PB; 24/305 P
[58] Field of Search .......................... 24/16 R, 16 PB, 24/30.5 R, 30.5 P, 17 A, 17 AP; 248/74.3

[56] References Cited

U.S. PATENT DOCUMENTS

| | | | |
|---|---|---|---|
| 4,573,242 | 3/1986 | Lankton et al. | 24/16 PB |
| 4,788,751 | 12/1988 | Shely et al. | 24/16 PB |
| 5,193,254 | 3/1993 | Geisinger | 24/16 PB X |
| 5,208,948 | 5/1993 | Nirei | 24/16 PB |
| 5,379,494 | 1/1995 | Shirakawa | 24/16 PB |

*Primary Examiner*—James R. Brittain
*Attorney, Agent, or Firm*—Bucknam and Archer

[57] ABSTRACT

A tying device, including a binding strip, which has a plurality of blocking incisions on one side arranged along the longitudinal direction, and a lock head with a lead opening, having two locking plates extending from opposite inner walls into the interior, wherein the locking plates each have a plurality of locking pawls. The improvement is: The blocking incisions are arranged in two rows on one side of the binding strip, wherein the two rows are separated by a ridge. The locking pawls on the locking plates each have a slot cut in the middle so as to accommodate the ridge on the binding strip. The shape of the locking pawls fits the shape of the blocking incisions, thereby attaining a blocking effect.

4 Claims, 5 Drawing Sheets

TYING DEVICE

BACKGROUND OF THE INVENTION

1. Field of the Invention

The present invention relates to a tying device, particularly to a tying device, which uses a binding strip of increased strength.

2. Description of Related Art

Binding strips are used to tie electric cables together to a bundle. As shown in FIG. 4 and 5, a conventional tying device comprises a binding strip 10a and a lock head 20a. The binding strip 10a has on one side a plurality of blocking incisions 11a of equal mutual distance. A lead opening 21a passes through the lock head 20a. From the inner wall of the lock head 20a two locking plates 22a extend into the interior. The two locking plates 22a are on the sides facing each other provided with locking pawls 23a, which exert a blocking force. When this kind of tying device is used, the binding strip 10a is wrapped around the objects 30a to be tied together, with the blocking incisions 11a facing outward. Then both ends of the binding strip 10a are, next to each other, put through the lead opening 21a of the lock head 20a. By pulling one end of the binding strip 10a, the binding strip 10a surrounds the objects 30a tightly. The locking pawls 23a, engaging with the blocking incisions 11a, prevent the binding strip 10a from sliding back and loosening again.

However, since the plurality of blocking incisions 11a are cut into the binding strip 10a, the strength of the binding strip 10a is reduced and it may break when used. Furthermore, the binding strip 10a cannot be taken away from the locking pawls 23a. when it is not used anymore, it has to be cut off and thrown away, leading to waste of material.

SUMMARY OF THE INVENTION

The primary objective of the present invention is to provide a tying device, in which the binding strip has blocking incisions that are arranged in two rows separated by a longitudinal central ridge, in order to increase the stability of the binding strip.

A further objective of the present invention is to provide a tying device, in which locking plates within the lock heads are each provided with a slot to accommodate the ridge on the binding strip.

A further objective of the present invention is to provide a tying device, in which locking plates each have a protrusion that enable the user to remove the binding strip manually, when it is not needed.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
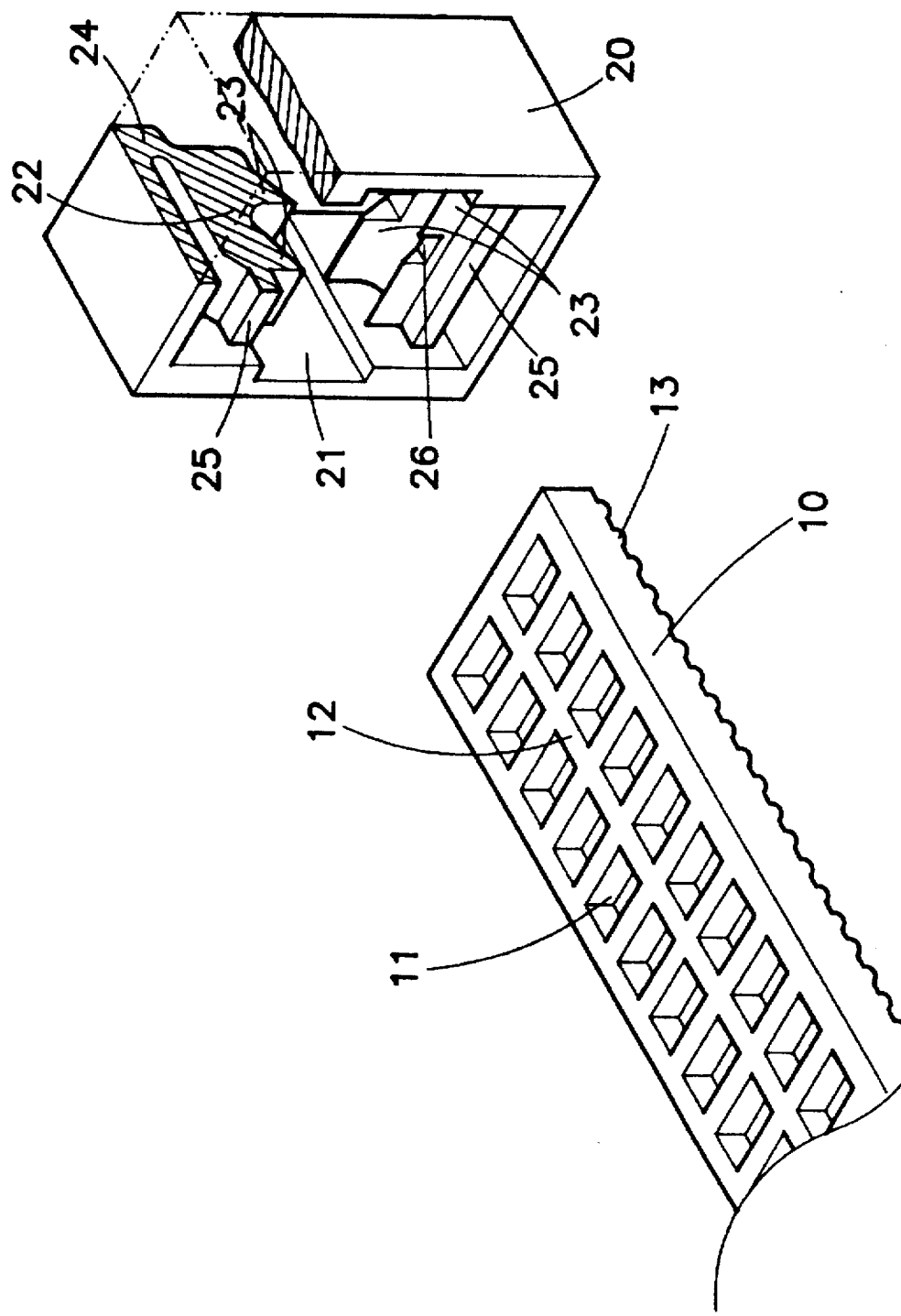
FIG. 1 is a perspective view of the first embodiment of the present invention.
Figure 2:
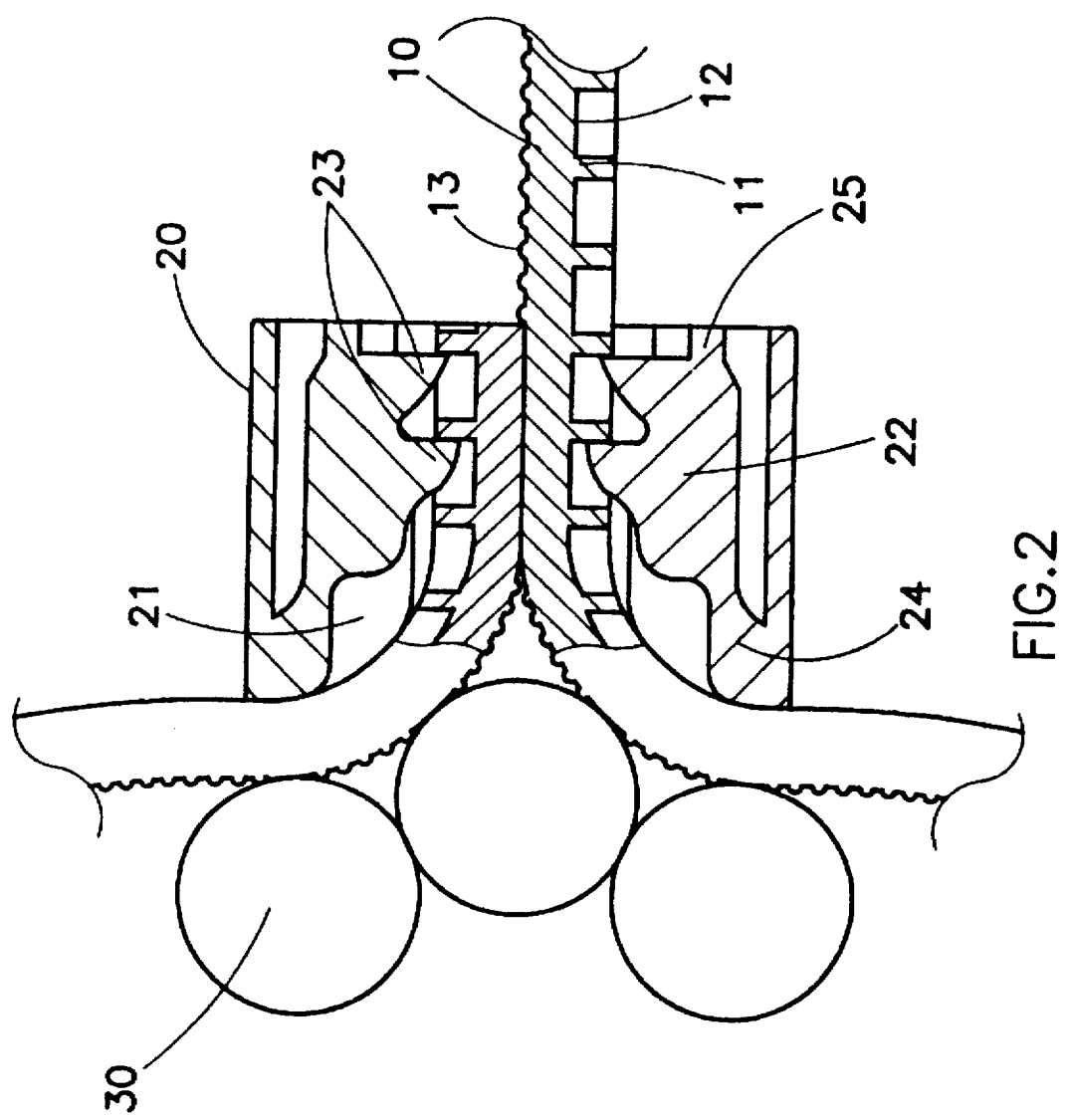
FIG. 2 is a schematic sectional view of the first embodiment of the present invention.

Referring to FIG. 1 and 2, the present invention provides an improved tying device. It comprises a binding strip 10 and a lock head 20. The binding strip 10 has on one side a plurality of blocking incisions 11 of equal mutual distance, arranged in pairs along its longitudinal direction. The binding strip 10 further has on the same side a ridge 12 along its longitudinal direction. The ridge 12 divides each pair of blocking incisions 11 into two single incisions. On the other side of the binding strip 10, a grooved surface 13 is provided for increasing the surface friction.

The lock head 20 is passed through by a lead opening 21. From each of the two opposite sides of the inner wall of the lead opening 21, a locking plate 22 extends into the interior of the lead opening 21. Each locking plate 22 is elastically linked to the inner wall of the lead opening 21 by a link part 24. The sides of the two locking plates 22 that face each other are each formed as a pair of locking pawls 23. Every single locking pawl 23 fits into one blocking incision 11, thus blocking the movement of the binding strip 10 in one direction. One side of each locking pawl 23 has a sloping surface to allow the movement of the binding strip 10 in the other direction. Each locking plate 22 has a protrusion 25 on its free end. In the middle of each locking pawl 23 a slot 26 has been cut, which accommodates the ridge 12 on the binding strip 10.

When the present invention is used, the binding strip 10 is laid around the objects 30 to be tied together, e.g., electric cables. Then both ends of the binding strip 10 are put through the lead opening 21 of the lock head 20 and pulled tight. By way of the blocking effect of the locking pawls 23 the binding strip 10 will not loosen again. The slots 26 accommodate the ridge 12 on both sides, so the ridge 12 will not hamper the blocking effect of the locking pawls 23. At the same time the ridge 12 enhances the stability of the binding strip 10. The protrusions 25 allow to pull apart the locking pawls 23 manually, in order to unblock the binding strip 10 if necessary, allowing to re-use it.

Figure 3:
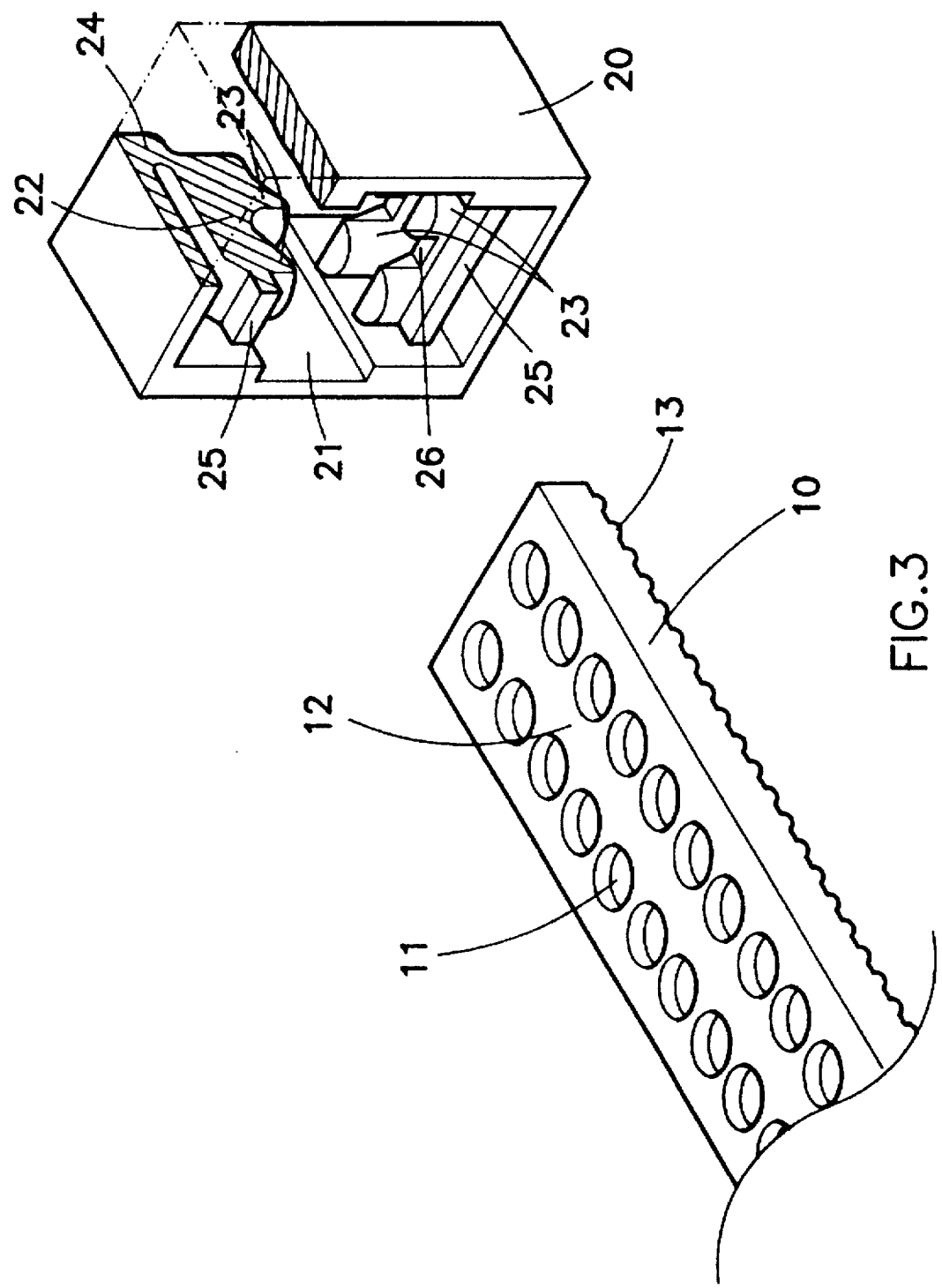
FIG. 3 is a perspective view of a further embodiment of the present invention.
Figure 4:
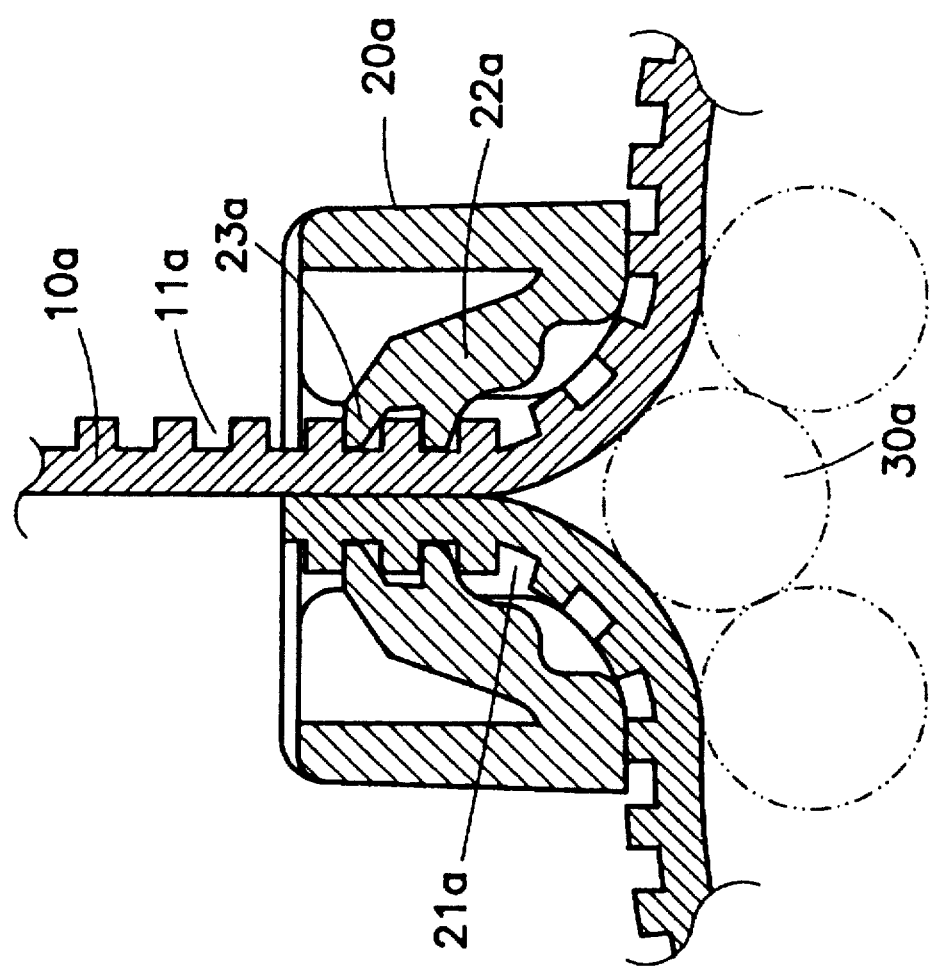
FIG. 4 (Prior Art) is a schematic sectional view of a conventional typing device.
Figure 5:
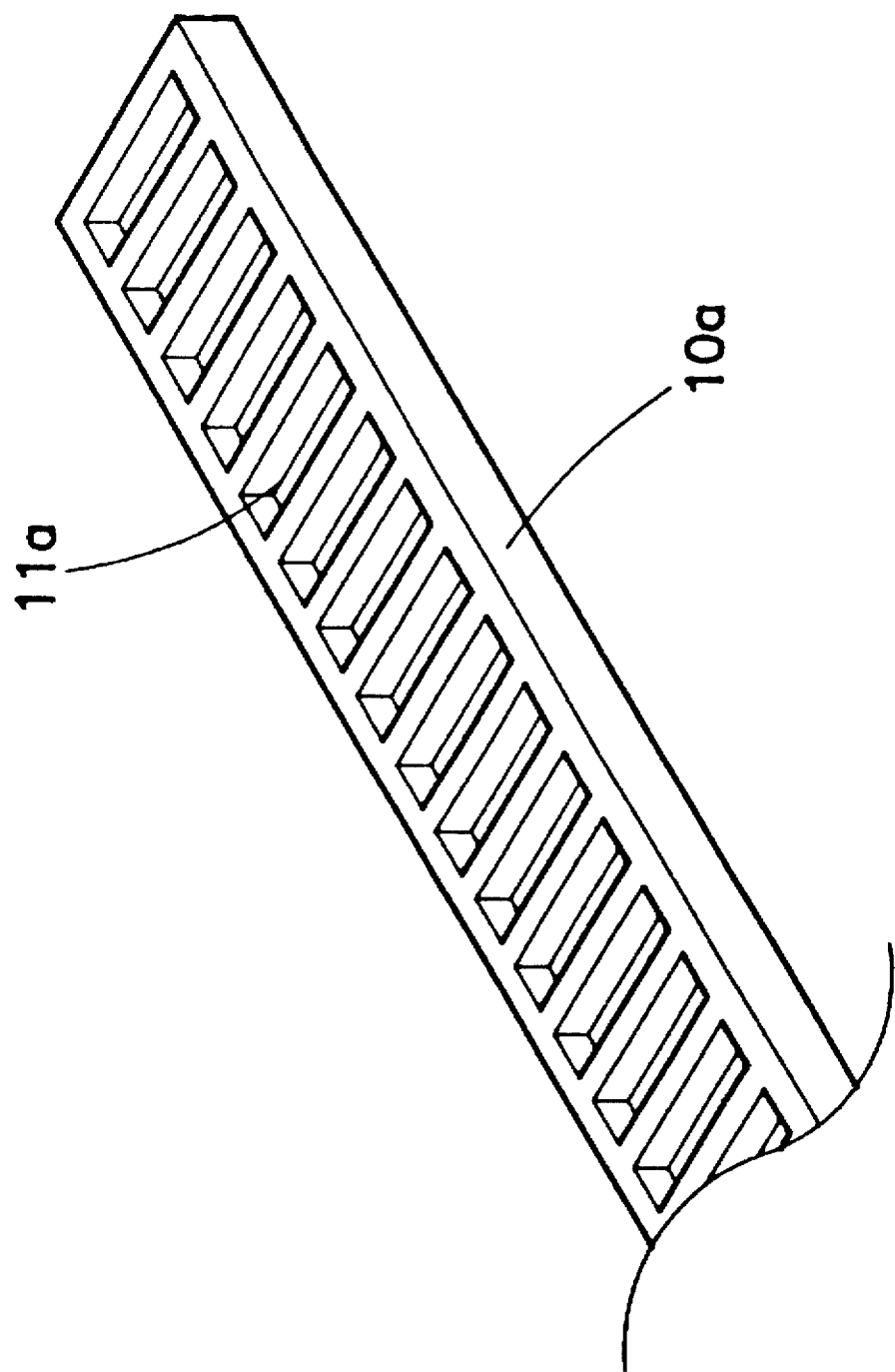
FIG. 5 (Prior Art) is a perspective view of a conventional binding strip.

Referring to FIG. 3, in another embodiment of the present invention, the blocking incisions 11 are of round shape. The locking pawls 23 of the two locking plates 22, accordingly, are cylindrically shaped with one sloping side. The use of this embodiment is like the use of the first embodiment, so it does not need to be explained further.

Furthermore, the blocking incisions 11 on the binding strip 10 may be shaped as an oval, a rhomb or another geometric form. The locking pawls 23 of the two locking plates 22 then take a corresponding shape, so as to attain a blocking effect, while the binding strip 10 has a high stability.

While the invention has been described with reference to preferred embodiments thereof, it is to be understood that modifications or variations may be easily made without departing from the spirit of this invention which is defined by the appended claims.

What is claimed is:

1. A tying device, comprising:

a binding strip, provided with a plurality of blocking incisions, which are arranged along the longitudinal direction on one side of said binding strip, defining the front side thereof; and a lock head, having a lead opening passing through said lock head, two locking plates, extending from opposite inner walls of said lead opening into said lead opening, having a free end each, and a plurality of locking pawls on each of said looking plates; wherein the improvement comprises:

- a ridge along the longitudinal direction on the front side of said binding strip, dividing said blocking incisions into two rows along the longitudinal direction of said binding strip;
- a plurality of slots, each of said slots being cut into one of said locking pawls to accommodate said ridge of said binding strip, such that said locking pawls fit into said blocking incisions, having a blocking effect;
- two protrusions, each of them on the free end of one of said locking plates; and
- a grooved surface on the back side of said binding strip, for increasing surface friction.

2. A tying device, as claimed in claim 1, wherein said blocking incisions are of rectangular, round, oval, or rhombic.

3. A tying device as claimed in claim 1, wherein said locking pawls are shaped as a solid rectangle, a cylinder, an oval, or a solid rhombus.

4. A tying device as claimed in claim 1, wherein each of said locking pawls has a sloping back to ease the forward movement of the binding strip.

* * * * *